United States Patent
Kapoor et al.

(10) Patent No.: US 7,907,609 B2
(45) Date of Patent: Mar. 15, 2011

(54) METHOD AND APPARATUS FOR ENHANCING ROHC PERFORMANCE WHEN ENCOUNTERING SILENCE SUPPRESSION

(75) Inventors: Rohit Kapoor, San Diego, CA (US); Magnus Kretz, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 980 days.

(21) Appl. No.: 11/545,956

(22) Filed: Oct. 10, 2006

(65) Prior Publication Data
US 2010/0278196 A1 Nov. 4, 2010

Related U.S. Application Data

(60) Provisional application No. 60/756,658, filed on Jan. 6, 2006.

(51) Int. Cl.
*H04L 12/28* (2006.01)
(52) U.S. Cl. ......... 370/389; 370/392; 370/471; 370/477; 370/394
(58) Field of Classification Search .......... 370/389, 370/477, 394
See application file for complete search history.

(56) References Cited

U.S. PATENT DOCUMENTS

| | | | |
|---|---|---|---|
| 6,680,955 B1 * | 1/2004 | Le | 370/477 |
| 7,061,936 B2 * | 6/2006 | Yoshimura et al. | 370/474 |
| 2004/0095939 A1 * | 5/2004 | Yang | 370/395.52 |
| 2005/0190700 A1 | 9/2005 | Melpignano | |

FOREIGN PATENT DOCUMENTS

| | | |
|---|---|---|
| RU | 2004119304 | 5/2005 |
| TW | 569579 | 1/2004 |
| WO | 0167709 | 9/2001 |

OTHER PUBLICATIONS

C. Bormann, Robust Header Compression (ROHC):Framework and four profiles, Jul. 2001.*
Borman C et al.: "Robust Header Compression: Framework and four profiles: RTP, UDP, ESP and uncompressed; rfc3095.txt" IETF Standard, Internet Engineering Task Force, IETF, CH Jul. 2001 XP015008878.
International Search Report—PCT/US07/060191—International Search Authority—European Patent Office—Nov. 16, 2007.
Borman C et al: "Robust Header Compression: Framework and four profiles: RTP, UDP, ESP and uncompressed; rfc3095.txt" IETF Standard, Internet Engineering Task Force, IETF, CH Jul. 2001 XP015008878.
2. Y. Gwon, J. Kempf, R. Dendukuri, and R. Jain, "Experimental Resultson IP-layer Enhancement to Capacity of VoIPv6 over IEEE 802.11b Wireless LAN," In Proc. of WiNMee, 2005, pp. 1-6.
Taiwan Search Report—TW096100635—May 3, 2010.
Written Opinion—PCT/US2007/060191, International Search Authority, European Patent Office,Nov. 16, 2007 (060276).

* cited by examiner

*Primary Examiner* — Dang T Ton
*Assistant Examiner* — Pamit Kaur
(74) *Attorney, Agent, or Firm* — Kristine U. Ekwueme

(57) ABSTRACT

Examples disclosed herein relate to methods and systems for enhancing performance of robust header compression (RoHC) compressor when encountering silence suppression. In one example, an RTP timestamp increment is calculated for successive packets, until a predetermined number of packets have a constant timestamp increment value. The constant RTP timestamp increment value is assigned as a timestamp stride (TS_STRIDE) value for compression, the value of each RTP timestamp (TS) is scaled by timestamp stride (TS_STRIDE) and the header is compressed using the assigned value.

24 Claims, 17 Drawing Sheets

US 7,907,609 B2

METHOD AND APPARATUS FOR ENHANCING ROHC PERFORMANCE WHEN ENCOUNTERING SILENCE SUPPRESSION

CLAIM OF PRIORITY UNDER 35 U.S.C. §119

The present Application for Patent claims priority to Provisional Application No. 60/756,658 entitled "METHOD AND APPARATUS FOR ENHANCING ROHC PERFORMANCE WHEN ENCOUNTERING SILENCE SUPPRESSION" filed Jan. 6, 2006, and assigned to the assignee hereof and hereby expressly incorporated by reference herein.

BACKGROUND

1. Field

This disclosure relates generally to communication systems. More specifically, examples disclosed herein relate to methods and systems for enhancing performance of a Robust Header Compression (RoHC) compressor when encountering silence suppression.

2. Background

The Internet Protocol (IP) has become the choice of transport protocol for both wired and wireless networks, and is leading to the convergence of telecommunication and data networks. Efforts have been undertaken to compress protocol headers, however, a challenge lies in developing efficient and robust header compression schemes.

DETAILED DESCRIPTION

Examples disclosed herein relate to methods and systems for enhancing performance of a Robust Header Compression (RoHC) compressor when encountering silence suppression. These examples may be implemented in any wireless and/or wired communication system, such as cellular networks, Public Switched Telephone Networks (PSTNs), wireless Internet, satellite networks, Wide Area Networks (WANs), Wireless Local Area Networks (WLANs), VoIP networks, IP-based multimedia systems, etc.

Figure 1:
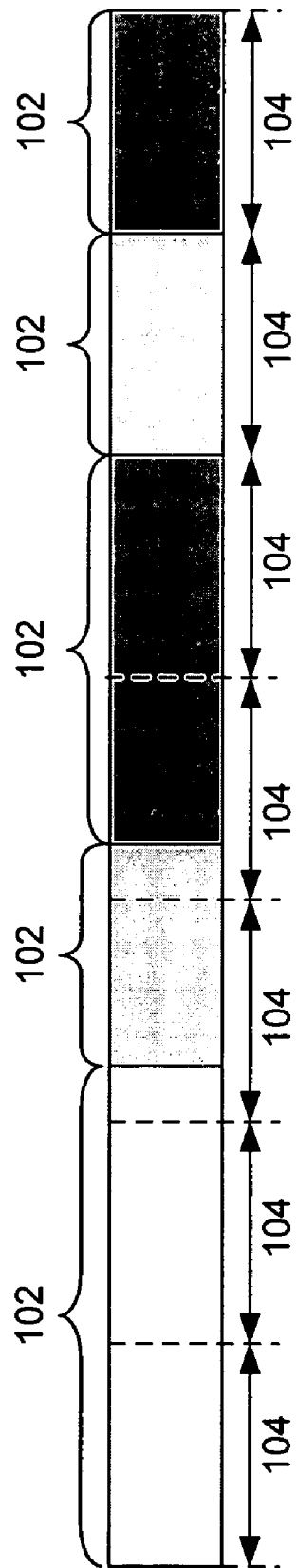
FIG. 1 illustrates frames and packets in a communication system.

In many services and applications, e.g., voice over IP (VoIP), video telephony, interactive games, messaging, etc., data is formed into packets and routed through a network. As used herein, a "frame" refers to a portion of a data frame formatted for transmission in a communication system. FIG. 1 illustrates several packets 102 and frames 104. A frame 104 may be a certain length in time, for instance, 20 msec, and may or may not coincide with the length of a packet 102. Each packet is sent to a destination in the network based on an assigned address, typically contained in a header.

The header marks the beginning of the packet; a trailer marks the end of a packet; and the "payload" refers to the data portion of a packet. A packet may have various types of headers such as Internet Protocol (IP), User Datagram Protocol (UDP), Real-Time Transport Protocol (RTP), and Transmission Control Protocol (TCP) headers. In certain scenarios, the payload of an IP packet may be of comparable size, or even smaller than the header.

Figure 2:
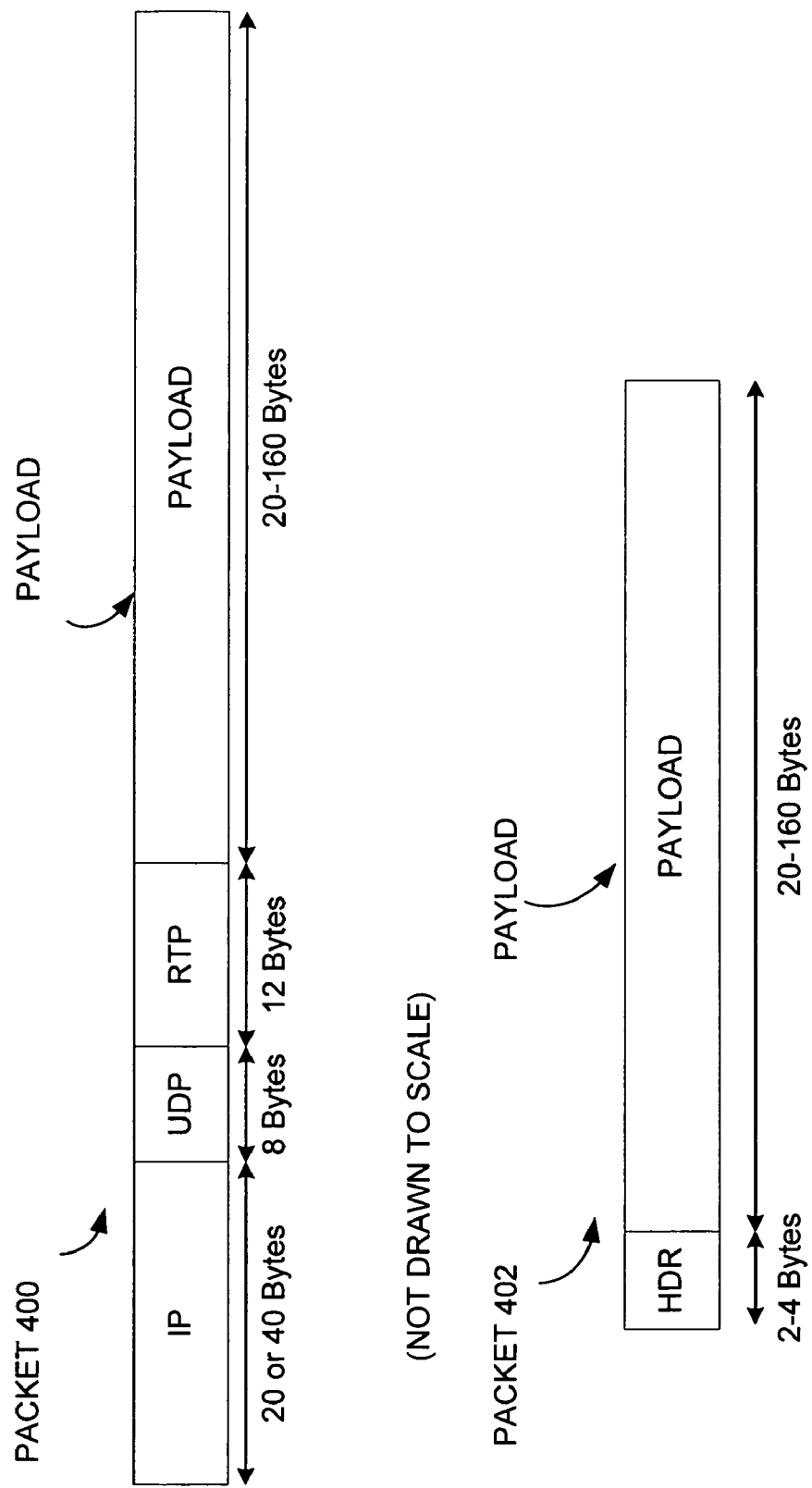
FIG. 2 illustrates an example of header compression.

In landline or wireline systems, constraints on bandwidth are low and data may be communicated by continuously sending full rate packets. In wireless communication systems however, there is limited bandwidth and thus a need to conserve it. A reduction in packet overhead may be accomplished by reducing the size of packet headers. Header compression improves quality, speed and network transmission efficiency. Further, interactive response time is improved by header compression, and it becomes possible to support more users within a certain channel bandwidth. This in turn, results in a reduction of deployment costs. FIG. 2 illustrates an example of header compression in a communication system implementing voice. In this example, the uncompressed header adds up to 40 bytes of overhead. With header compression, the resulting overhead is 2-4 bytes instead. Header compression helps conserve necessary bandwidth over the network.

Figure 3:
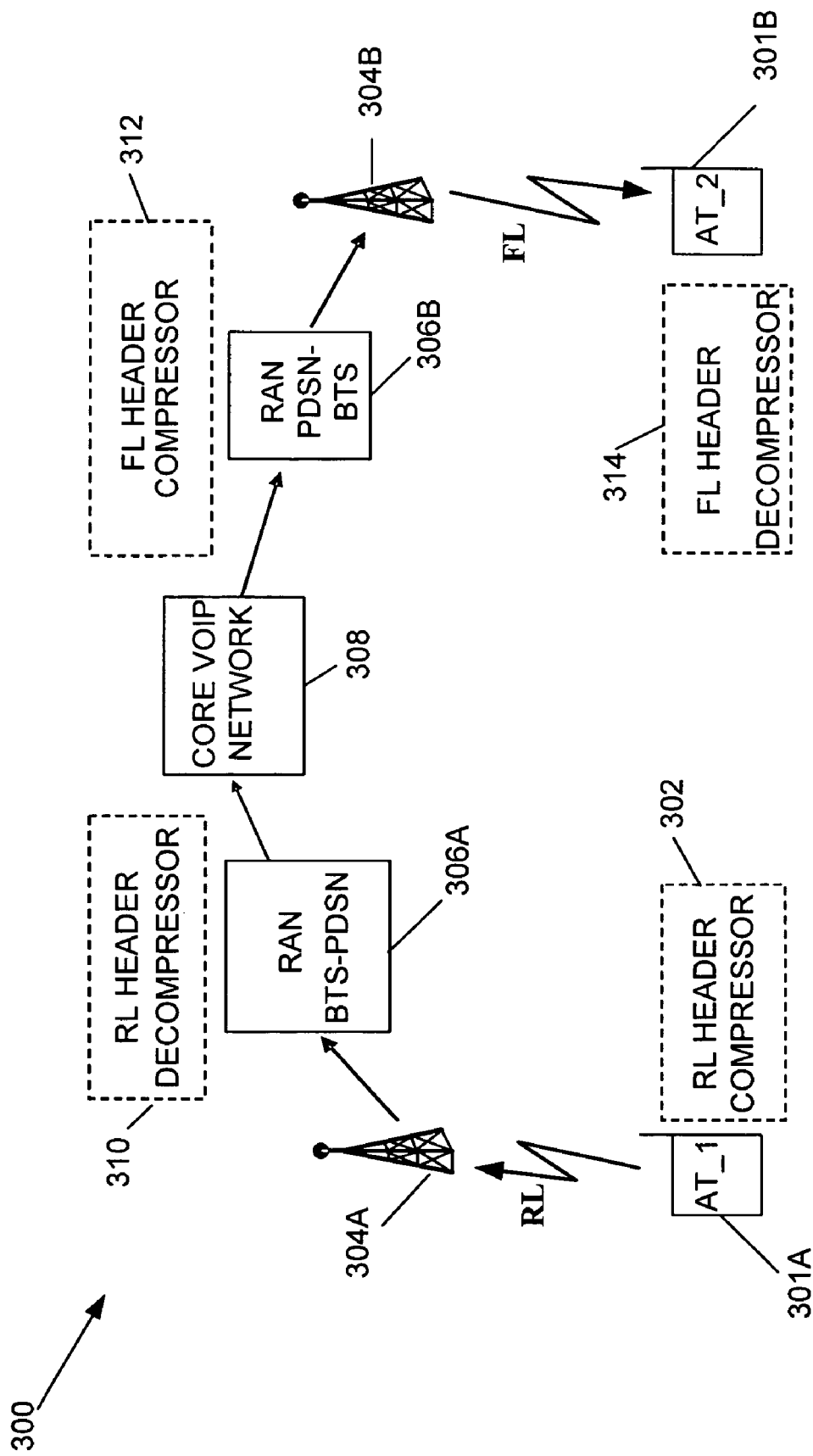
FIG. 3 illustrates an example of a communication system.

FIG. 3 illustrates an example of a communication system 300 in which one or more methods described herein may be implemented. A first Access Terminal (AT) 301A includes a Reverse Link (or uplink) header compressor 302. The first access terminal 301A communicates wirelessly via a Reverse Link (RL) with a base station 304A and a Base Station Transceiver System/Packet Data Serving Node (BTS-RNC-PDSN) 306A in a Radio Access Network (RAN).

The BTS-RNC-PDSN 306A includes a reverse link header decompressor 310, which may perform one or more methods described herein. The BTS-RNC-PDSN 306A communicates with a Packet Data Serving Node/Base Station Transceiver System (PDSN-BTS) 306B via a VoIP network 308. The PDSN-BTS 306B includes a forward link (or downlink) header compressor 312.

Base station 304B and PDSN-BTS 306B may communicate wirelessly via a forward link with a second access terminal 301B. The second access terminal 301B includes a forward link header decompressor 314, which may perform one or more methods described herein. Instead of two wireless access terminals 301A, 301B, one of the access terminals may be a wired terminal. Reverse link header compressor 302 and reverse link header decompressor 310 represent a first compressor-decompressor pair. Forward link header compressor 312 and forward link header decompressor 314 represent a second compressor-decompressor pair.

The reverse link and forward link may use one or more communication protocols, such as Code Division Multiple Access (CDMA) 1x, CDMA 1xEV-DO (Evolution Data Optimized), Wideband CDMA (WCDMA), Time Division Synchronized (TD-SCDMA), Global System for Mobile communications (GSM), OFDM (Orthogonal Frequency Division Multiplexing), systems supporting IEEE standards, such as 802.11 (A,B,G), 802.16, etc.

The "access terminal" described herein may refer to various types of devices, such as a wired phone, a wireless phone, a cellular phone, a laptop computer, a wireless communication Personal Computer (PC) card, a Personal Digital Assistant (PDA), an external or internal modem, etc. An access terminal may be any data device that communicates through a wireless channel or through a wired channel, for example using fiber optic or coaxial cables. An access terminal may have various names, such as access unit, subscriber unit, mobile station, mobile device, mobile unit, mobile phone, mobile, remote station, remote terminal, remote unit, user device, user equipment, handheld device, etc. Access terminals may be mobile or stationary and may be dispersed throughout the communication system 300 of FIG. 3. Access terminals may communicate with one or more Base Station Transceiver systems (BTSs), which may be called (or include) base stations, access networks, access points, Node Bs, or Modem Pool Transceivers (MPTs).

Figure 4:
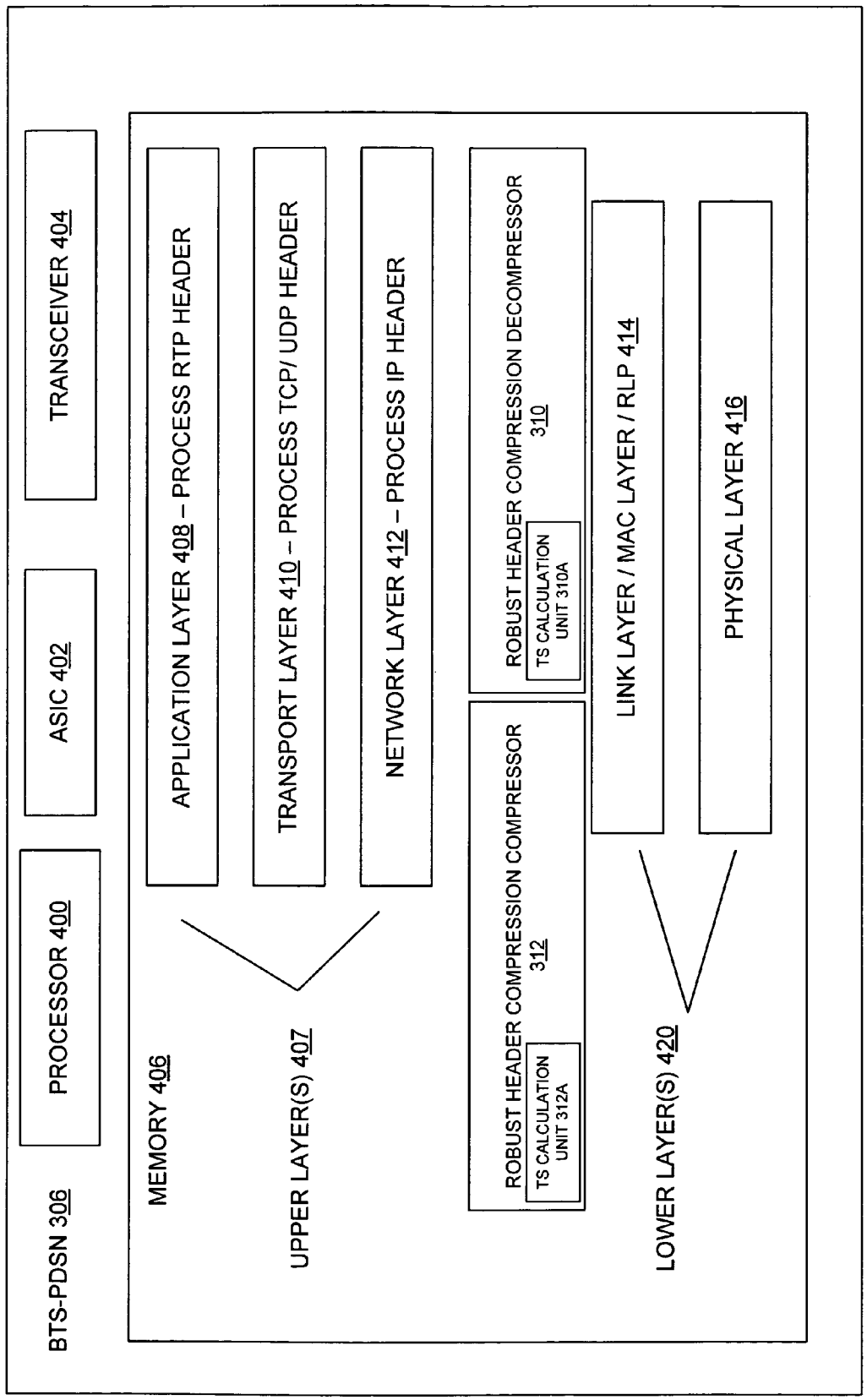
FIG. 4 illustrates some hardware and software components of a BTS-RNC-PDSN.

FIG. 4 illustrates an example of some hardware and software components of the BTS-RNC-PDSN 306A and/or PDSN-BTS 306B of FIG. 3. One example includes a processor 400, an Application Specific Integrated Circuit (ASIC) 402, a transceiver 404, and a memory 406. The memory 406 stores one or more upper layers 407, such as an application layer 408, a transport layer 410, and a network layer 412. The application layer 408 processes Real-Time Transport Protocol (RTP or RTCP) headers. The transport layer 410 processes Transmission Control Protocol (TCP) and User Datagram Protocol (UDP) headers. The network layer 412 processes IP headers.

The memory 406 may also store a robust header compression compressor 312 and a robust header compression decompressor 310. Robust header compression compressor 312 may store a timestamp calculation unit 312A and robust header compression decompressor 310 may store a timestamp calculation unit 310A. Memory 406 may also store one or more lower layers 420, such as a link layer Medium Access Control (MAC) layer 414, which may include a Radio Link Protocol (RLP) sublayer. The lower layers 420 may also include a physical layer 416.

Figure 5:
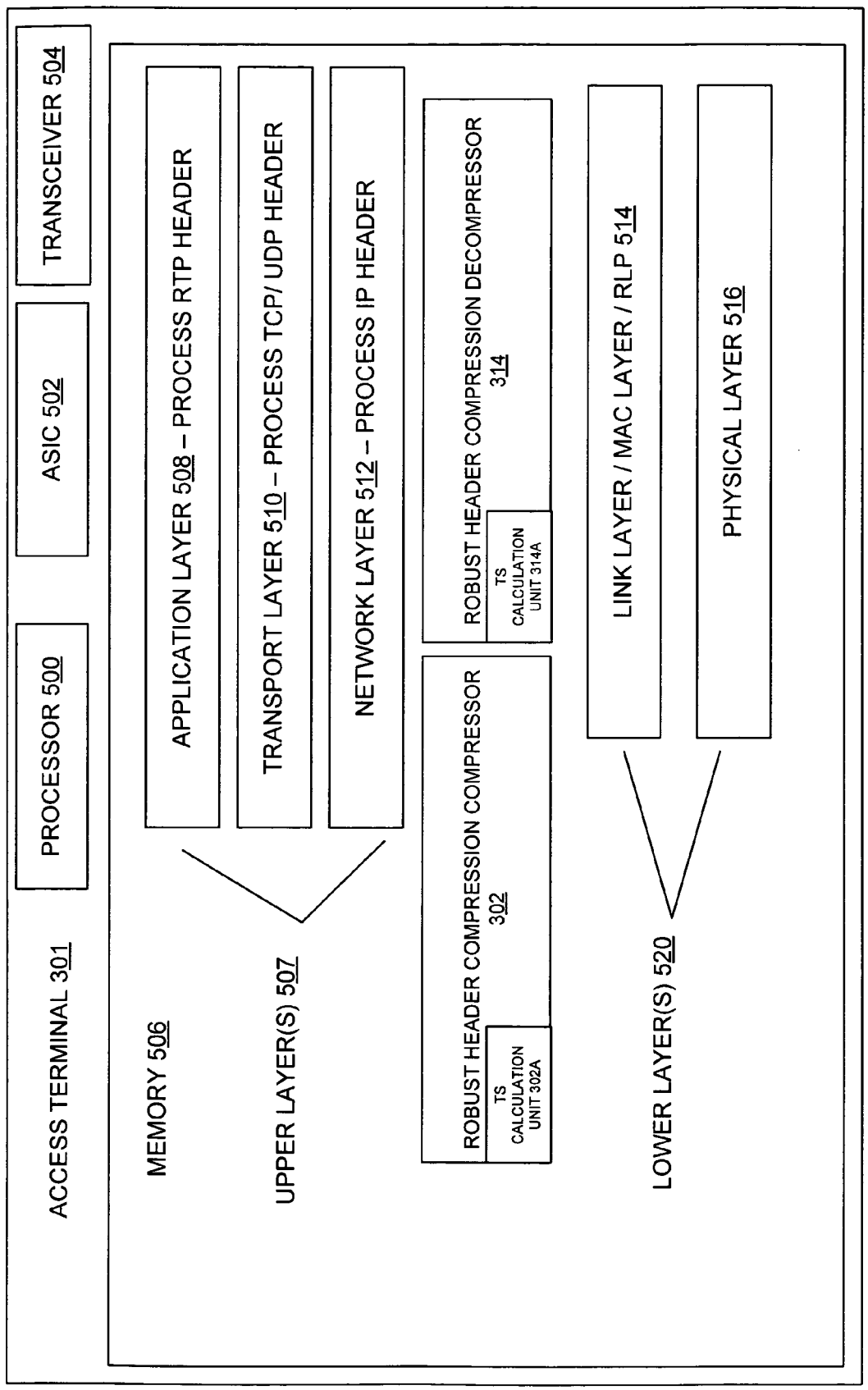
FIG. 5 illustrates some hardware and software components of an access terminal.

FIG. 5 illustrates some hardware and software components of the access terminals 301A, 301B of FIG. 3. One example includes a processor 500, an ASIC 502, a transceiver 504, and a memory 506. The memory 506 may store one or more upper layers 507, such as an application layer 508, a transport layer 510, and a network layer 512. The application layer 508 may process RTP headers. The transport layer 510 may process TCP and UDP headers. The network layer 512 may process IP headers.

The memory 506 may also store a robust header compression compressor 302 and a robust header compression decompressor 314. Robust header compression compressor 302 may store a timestamp calculation unit 302A and robust header compression decompressor 314 may store a timestamp calculation unit 314A. Memory 506 may also store one or more lower layers 520, such as a link layer MAC layer 514, which may include an RLP sublayer. The lower layer 520 may also include a physical layer 516.

RoHC is a header compression scheme that efficiently compresses RTP/UDP/IP headers. Robust header compression is described in Request For Comments (RFC) 3095, entitled "Robust Header Compression (ROHC): Framework and four profiles: RTP, UDP, ESP and uncompressed," which is an Internet standards track protocol distributed by the Network Working Group of The Internet Society in July, 2001.

Generally, packets transferred over a link are not independent from each other, but share particular common parameters, e.g., source addresses, destination addresses, etc. Header compression is made possible by the significant redundancy between header fields within the same packet or between consecutive packets belonging to the same packet stream. A "packet stream" refers to a sequence of packets, usually grouped together logically, e.g in an audio packet stream or video packet stream. A RoHC algorithm uses common parameters in a packet stream to compress packet headers by maintaining certain state information. This state information is referred to as a "context."

A compressor-decompressor pair maintain a context at each side for each packet stream. The context for each packet stream is identified by the same Context Identifier field (CID) at the compressor and the decompressor. For instance, RL header compressor 302 and RL header decompressor 310 in FIG. 3 may each maintain a context, "$CID_1$" for a particular voice flow, "$VF_1$." The context contains information from previous headers in the packet stream and other possible reference values for compression and decompression. Data describing the packet stream, such as information about how an IP Identifier field changes and inter-packet increases in Sequence Number (SN) or Timestamp (TS) is also contained in a context. In order to ensure a robust header compression scheme, there is a need for mechanisms to avoid context inconsistencies, and to make contexts consistent when they are not.

Initially, a compressor and decompressor may not have an agreement on compressing or decompressing a certain packet stream. A compressor may send RoHC packets having static and dynamic information about a packet stream to, the decompressor to establish a context. Once both static and dynamic fields are set up, a compressor need only send minimal information to advance the regular sequence of compressed header fields. The compressor and decompressor update their contexts upon certain events.

Static header fields need to be transmitted only at the establishment of a context as these fields remain constant afterwards. More sophisticated algorithms are required to compress the dynamic aspects of a header field. A dynamic header field may be compressed or decompressed directly by a RoHC algorithm. However, it may be more effective to compress or decompress a header field by using a linear function of other fields such as an increasing SN or TS. This requires fewer bits. By sending static field information only initially, and utilizing dependencies and predictability for other fields, the header size may be significantly reduced for most packets.

Figure 6:
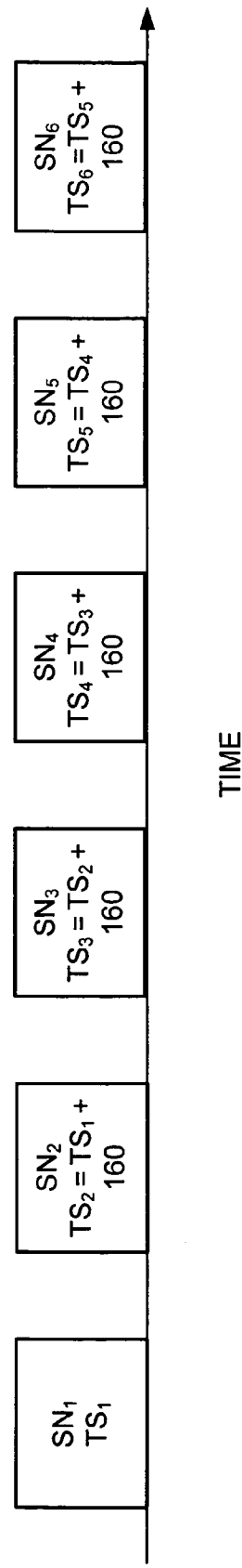
FIG. 6 illustrates a series of packets in a packet stream.

The SN of an RTP packet increments by one for each transmitted packet and may be used by a receiver to restore packet sequence and to detect packet loss. The TS may reflect the sampling instant of a first octet in the RTP data packet. The sampling instant is derived from a clock that increments monotonically and linearly in time. In applications that process speech, the TS may be incremented by a constant delta that corresponds to the number of samples in each speech packet. For instance, an input device may receive speech packets having 160 sampling periods, thus TS is incremented by 160 for each packet. FIG. 6 illustrates a series of packets in a stream with consecutive SN and TS in increments of 160. The TS increment is the same, i.e. 160, whether the packet carries a segment of speech or represents a segment of silence. This is also true whether or not silence suppression is implemented. Silence suppression is discussed in further detail hereinbelow.

Figure 7A:
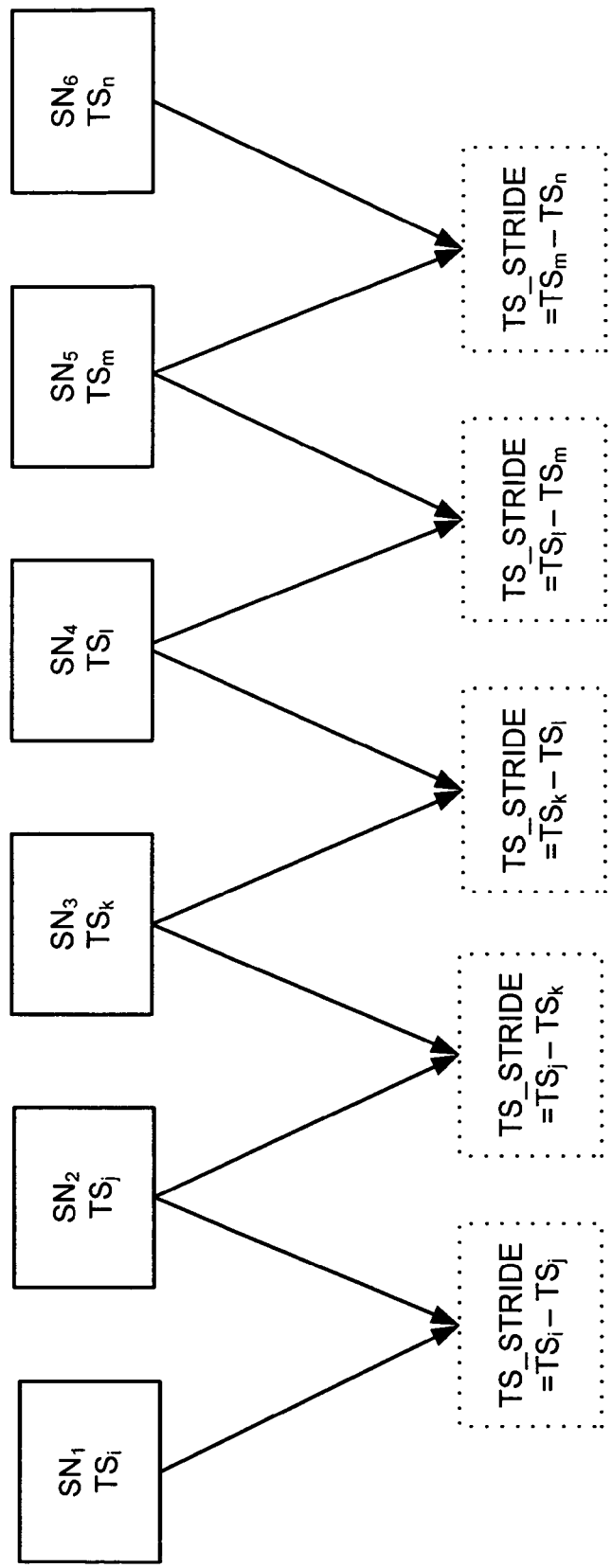
FIG. 7A illustrates consecutive packets of speech.

A RoHC compressor estimates the increment in RTP TS between two successively generated packets. Where the RTP packets have consecutive sequence numbers, this increment is referred to as TS_STRIDE. Generally, TS_STRIDE between consecutive packets of the same type is a fixed amount. For instance, FIG. 7A illustrates an application where $SN_1, \ldots SN_6$ represent packets of speech having consecutive SNs, 1, . . . 6. As illustrated, TS_STRIDE between each pair of packets is the difference in TS between a particular packet and the previous packet. As illustrated, TS_STRIDE between two packets is given as $TS_j-TS_i$, where i and j are consecutive SNs. In FIG. 7A, TS_STRIDE=$(TS_j-TS_i)=(TS_k-TS_j)=(TS_l-TS_k)$, etc. Knowledge of this fixed amount enables the compressor to scale the RTP TS before compression. Thus, accurate determination of TS_STRIDE between packets is required for efficient compression of the RTP timestamp field.

Figure 7B:
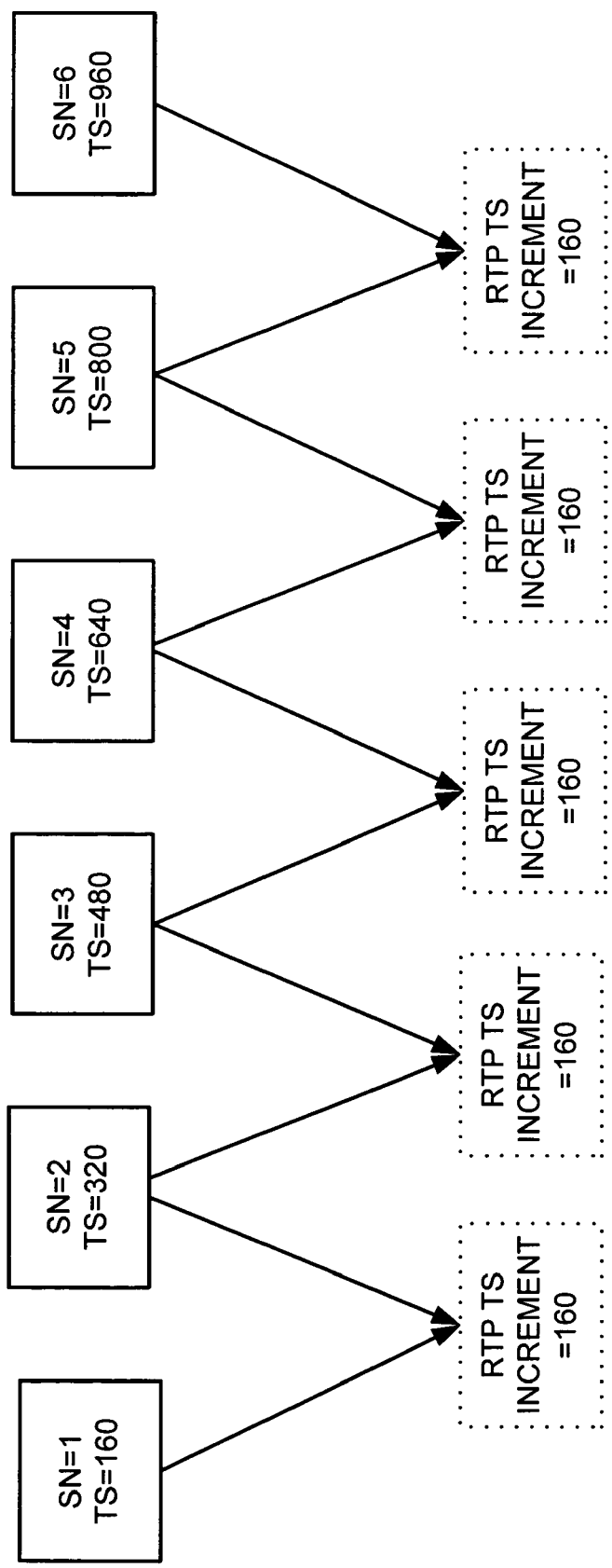
FIG. 7B illustrates a speech segment represented by six consecutive packets.

Use of a scaled RTP TS reduces header overhead since scaling results in the compression of a smaller value and consequently, fewer bits. For instance, consider voice carried over RTP/UDP/IP. In a voice codec producing 20 msec packets sampled at 8 kHz, the RTP TS increases by the number of samples contained in 20 msec, or 8000*0.02=160 samples. A segment of speech represented by six consecutive packets is illustrated in FIG. 7B. The RTP TS increments by 160 between consecutive packets, therefore, RTP TS of the first packet is 160, RTP TS of the second packet is 320, RTP TS of the third packet is 480, etc. Here, a compressor may use scaled RTP TS values of 1, 2, 3 etc instead of RTP TS values of 160, 320, 480 etc. In the latter case, a compressor would need to encode a change of 160, whereas in the former case it would need to encode a change of 1, thus using fewer bits. In one example, the RoHC algorithm may compress the RTP SN field and then use linear relations from RTP SN to other changing fields such as the RTP TS.

In another aspect of the disclosed invention, Least Significant Bits (LSBs) encoding may be used to compress the header fields. Using LSBs encoding, the k least significant bits of a field value are transmitted in place of an entire field value, where k is a positive integer. A decompressor receives the k bits and derives the original value using a previously received value as a reference. This value may be referred to as "v_ref." To illustrate, using LSB encoding, the binary 00001010 (corresponding to decimal 10), comprises Most Significant Bits (MSBs) 0000, and LSBs 1010. Instead of transmitting all eight bits of the original value, the four LSBs 1010 may be transmitted to a receiving device. If successfully received, a decompressor derives the original packet value using v_ref. V_ref may be stored in a context. In one example, v_ref represents the last correctly decompressed packet value. Assuming successful decompression of the received header, the context of the decompressor is updated to 00001010 and the original packet regenerated. Upon successful regeneration, v_ref may be updated to a current correctly decompressed value and stored. Assuming a next value, 00001111 (decimal value 15), is to be transmitted, the four LSBs 1111 may be transmitted and if successfully received, the decompressor updates its context by appending the received value 1111 to the MSBs of the current context value and checking if the generated value is within an interpretation interval. In this example, the current context value is 00001010, and the MSBs are 0000. The decompressor would update its context value to 00001111 and regenerate the originally transmitted packet value.

In speech coding, background noise is generally transmitted in conjunction with speech. If the transmission of speech is cut off, there is also a cut off of background noise. Discontinuities in the transmission of background noise may be disconcerting to a listener who expects feedback from the other side of the communication link. Generally background noise serves as feedback. During a "silence" interval (an instance in a full duplex conversation where at least one of the parties is silent) the channel may communicate background noise information using smaller sized packets. For instance, many CDMA systems send a continuous train of one eighth rate packets every 20 msec during a silence period to communicate background noise. In order to conserve bandwidth in a packet-switched system, most packets representing silence may be dropped. This is done without compromising the quality of the communication channel and may be referred to as silence suppression.

In vocoders such as Advanced Multi-Rate (AMR) Codec and Enhanced Variable Rate Codec (EVRC), a data compression scheme is incorporated for coding speech. In such applications, synthetic noise similar to background noise on the transmit side is generated on the receive (RX) side. When speech is not present, synthetic noise is estimated on the transmit side and transmitted to the receive side at frequent intervals. This allows the synthetic noise at the receiver to adapt to changes in the transmit side noise. In AMR coding for instance, during silence periods, the evaluated background noise is encoded into a packet referred to as a Silence Descriptor (SID) packet. The background noise parameters to be encoded into an SID packet are calculated over eight consecutive packets and the SID packet is transmitted to the receiver side every eighth packet. Effectively, seven out of every eight SID packets generated are dropped at the source. Thus, during silence periods, an AMR Codec generates and transmits SID packets every 8*20=160 msecs. This is contrasted to regular speech packets in a talkspurt which are generated every 20 msec. At the receiver side, the background noise generation is started or updated whenever a valid SID packet is received.

Figure 8:
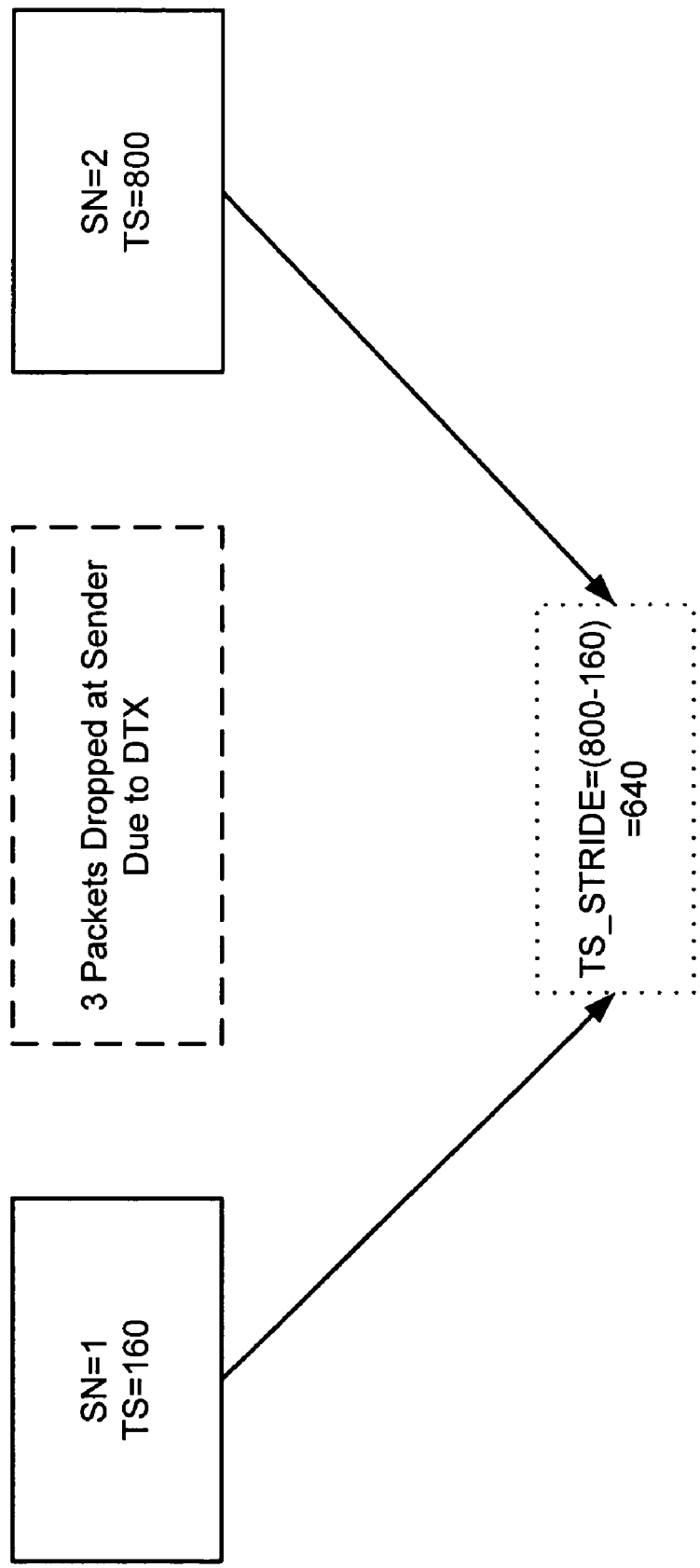
FIG. 8 illustrates silence suppression in one example.

In a system implementing silence suppression, an RTP TS may jump in proportion to the length of the silence period. During silence suppression, although some packets are dropped, RTP TS continues to increment while RTP SN does not. This is illustrated in FIG. 8 where a packet is generated and assigned a SN of 1 and has a TS of 160. This packet may represent a segment of speech. Subsequently, three packets are dropped at the sender. The dropped packets may be one eighth rate packets representing background noise. In this illustration, the three dropped packets are assigned TSs 320, 480 and 640, in order. They are not assigned SN's. In FIG. 8, a fifth packet, representing a segment of a talkspurt following the silence period is generated and is assigned a SN of 2. The fifth packet is assigned a TS of 800 since the increment in TS is 160. In this illustration, TS_STRIDE between the first received packet, SN=1; and the last received packet, SN=2 is calculated as 800−160=640.

Figure 9:
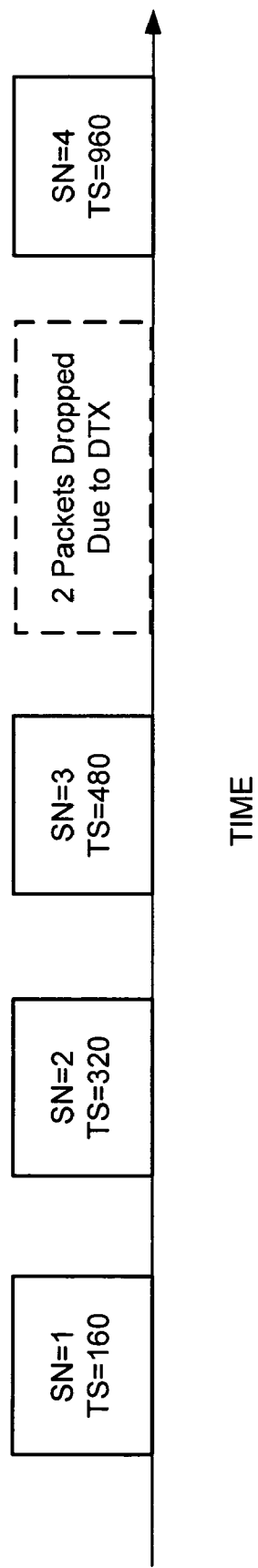
FIG. 9 illustrates silence suppression in another example.

Generally, when TS_STRIDE is a fixed value between consecutive packets, the compressed value of a scaled RTP TS is communicated by the compressor to the decompressor where it is decompressed. With a fixed TS_STRIDE value, it requires few bytes, such as in a UOR-0 or UOR-1 packet to transmit compressed values to the decompressor. A detailed description of these packet formats is found in RFC 3095. These packets are generally one to three bytes in length (plus two bytes of UDP checksum, if applicable) and contain SN, TS and CRC information, which is used to update the context of a header compression scheme. For instance, in FIG. 9, it is assumed the source implements silence suppression. Packets, $SN_1$, $SN_2$, $SN_3$ and $SN_4$ are transmitted with TS=160, 320, 480 and 960, respectively. Assume 2 silence packets were silence suppressed between packet $SN_3$ and $SN_4$. Assume further that at the compressor, the TS of each packet is compressed by TS_STRIDE=160. Therefore, the first packet has a scaled TS of 1, the second packet a scaled TS of 2, the third packet, a scaled TS of 3, and the fourth packet a scaled TS of 6. Here, using LSB encoding, upon receipt of the second packet, $SN_2$, the RoHC algorithm updates the context of the compressor to represent the scaled value of 2 as 0010. Upon receipt of the third packet, $SN_3$, the context is updated with TS information and the bits 0010 are updated to 0011. In this scenario, only the last few bits needs to be changed. Thus the context can be updated by using a small packet, such as a UOR-0 or UOR-1 packet. The small size of UOR-0 and UOR-1 packets makes it possible to maintain efficient use of bandwidth.

Figure 10:
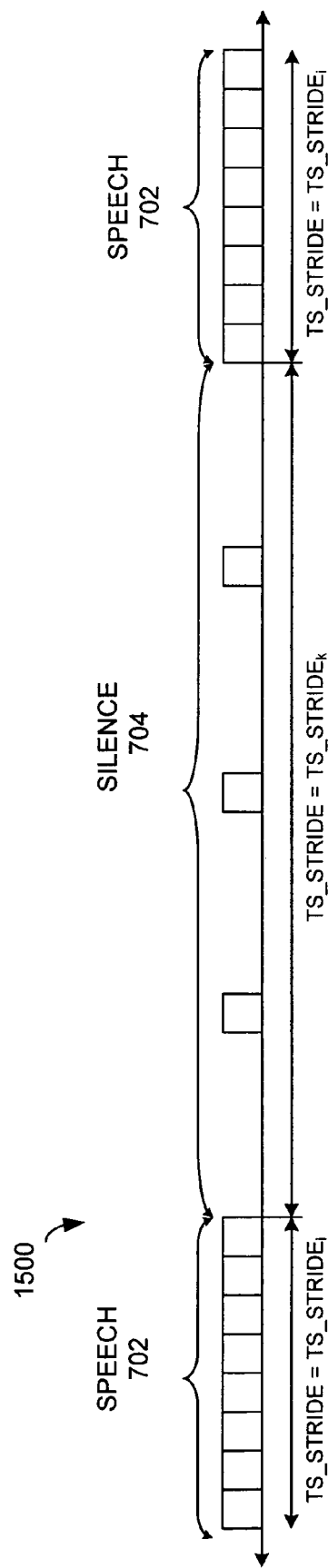
FIG. 10 illustrates changes in TS_STRIDE in one example.

In a scenario where the value of TS_STRIDE changes, a packet larger than a UOR-0 or UOR-1 is required to communicate the change in TS_STRIDE. For instance, a UOR-2 ext 3, IR-DYN or IR packet may be used. These packets are at least 7 or 8 bytes long and bandwidth becomes a concern, especially when it is required to transmit these packets multiple times (if the TS_STRIDE change is to be communicated reliably, these packets may have to be repeated a few times). When the RTP source employing silence suppression transitions from silence to speech (and speech to silence), the RoHC compressor may think that the TS_STRIDE has changed, causing it to send the updated TS_STRIDE. In order to communicate this TS_STRIDE reliably, the updated TS_STRIDE has to be sent a few times. For instance, in FIG. 10, TS_STRIDE is a first value, $TS\_STRIDE_i$ during a first segment of speech, a second value, $TS\_STRIDE_k$, during a period of silence and the first value, $TS\_STRIDE_i$ at the second period of speech. During each change in TS_STRIDE, for instance from $TS\_STRIDE_i$ to $TS\_STRIDE_k$, the RoHC compressor may update its context and this requires use of more bits, representing the updated value of TS_STRIDE. In turn, larger UOR-2 ext 3 packets, which may be transmitted multiple times, are used to communicate the changed TS_STRIDE. Referring back to FIG. 9, there is a jump in TS_STRIDE between packets $SN_3$ and $SN_4$ due to silence suppression. Upon receiving packet $SN_3$, the compressor may estimate TS_STRIDE as 160, whereas upon receiving SN4, the compressor estimate TS_STRIDE as 480. When the RTP source goes back to speech, the compressor may again estimate the TS_STRIDE as 160. Each time the TS_STRIDE changes, the compressor may need to send a UOR-2 ext 3 (or IR or IR-DYN) packet to communicate this change to the decompressor.

In one example, in order to overcome inefficiencies caused by a change in TS_STRIDE value between packets, the compressor may not change its value of TS_STRIDE until it sees a new TS_STRIDE recurring in "N" consecutive occurrences. In other words, a compressor may continue to use its earlier calculated value of TS_STRIDE until a predetermined number N consecutive values of new calculated TS_STRIDEs yield the same value. This example is illustrated in FIG. 11.

Figure 11:
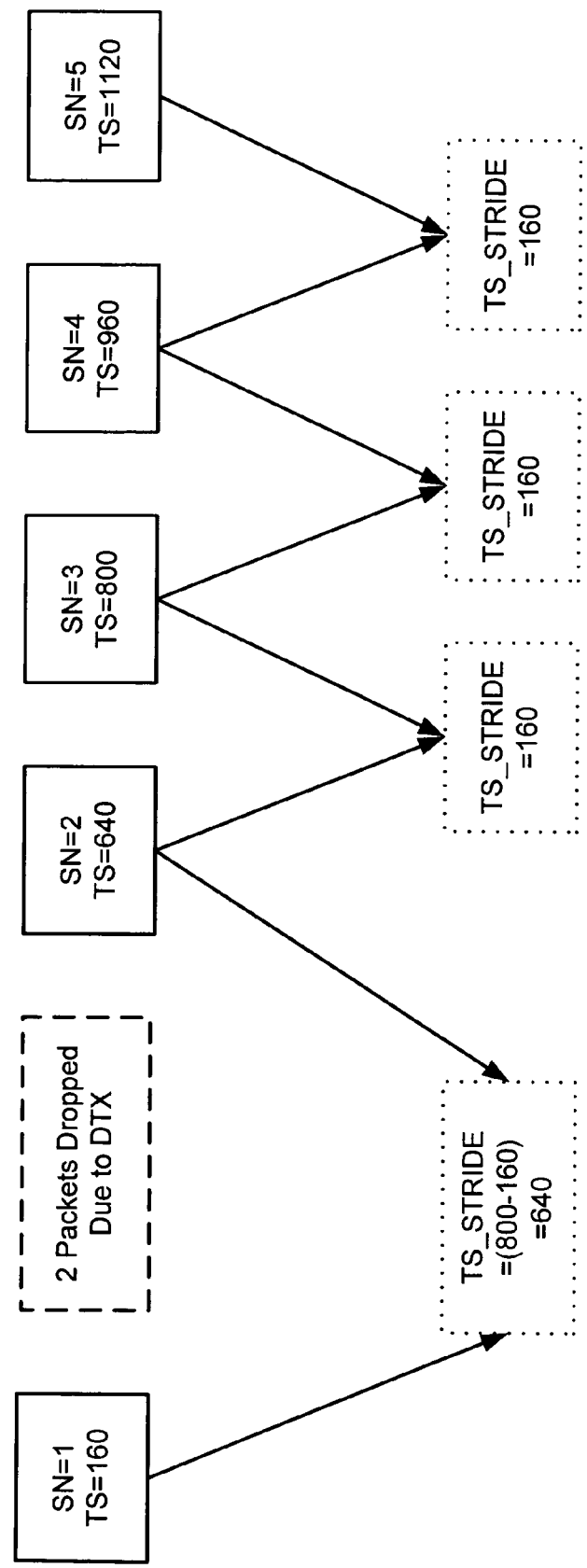
FIG. 11 illustrates an example of a process configured to improve performance of RoHC.

In FIG. 11, a packet $SN_1$, TS=160 is generated. This is followed by two packets which are subsequently dropped at the sender due to silence suppression, and then by the generation of four packets $SN_2$, $SN_3$, $SN_4$, and $SN_5$. These packets have TS values 640, 800, 960, and 1120, respectively. As illustrated, the last three consecutive values of TS_STRIDE stay constant, with TS_STRIDE=160. The compressor may thus use TS_STRIDE=160 for compression. In the above illustration, N=3 was used, however, the value of N may be application dependent. Moreover, even though the RTP TS jumped by 480 between packets $SN_3$ and $SN_4$, the compressor did not update its estimate of TS_STRIDE since the RTP TS increment of 480 occurred only once. In other examples, the compressor may use other values for N (e.g., 5) in determining the correct value for TS_STRIDE.

Figure 12:
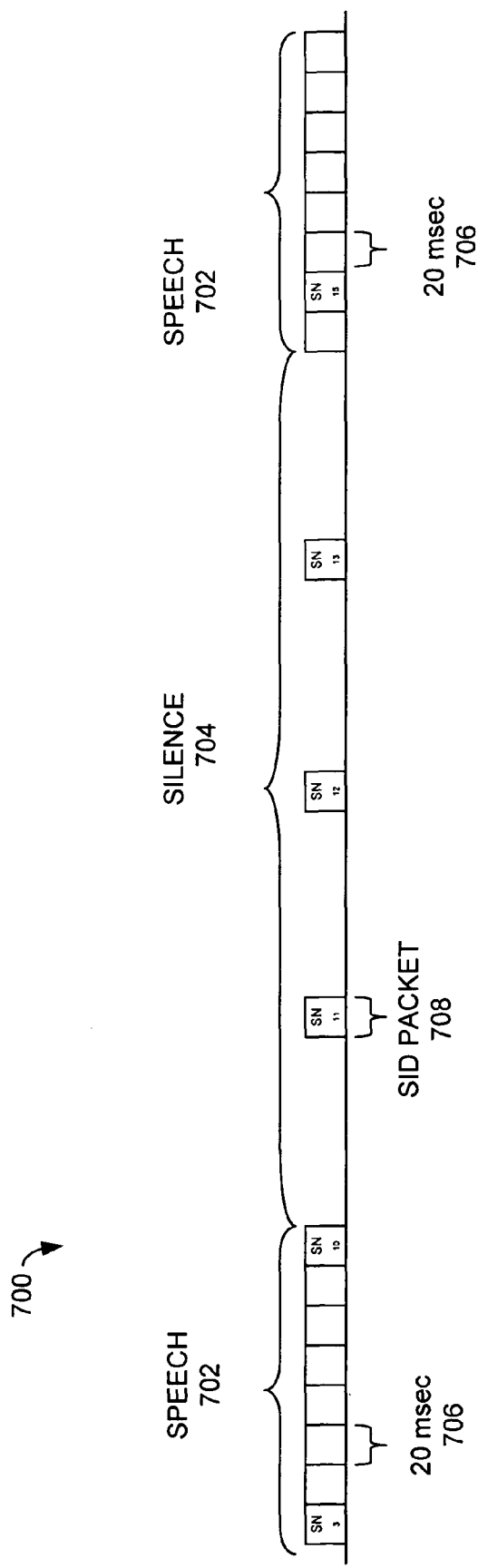
FIG. 12 illustrates periods of talkspurts and periods of silence in AMR.

A scenario using TS_STRIDE occurring N consecutive times may not be optimal where several (more than the value of N) consecutive SID or $1/8^{th}$ rate packets are sent during silence. These packets may be spaced apart by an equal amount of time at the source, and thus have the same change in RTP TS. For instance, suppose TS_STRIDE is selected as a value occurring in N consecutive occurrences of TS_STRIDE in an AMR application. As illustrated in FIG. 12, eight 20 msec packets 706 are transmitted during a segment of speech 702 and TS_STRIDE is calculated as (8000 KHz*0.020 sec)=160. During silence, one SID packet 708 is transmitted for every eight packets generated during silence 704. TS_STRIDE during silence is (8000 KHz*0.160 sec)= 1280. In FIG. 12, packet $SN_9$ has a TS of (160)*(9)=1440, packet $SN_{10}$ has a TS of (160)*(10)=1600, SID packet $SN_{11}$ has a TS of (160)*(18)=2880, SID packet $SN_{12}$ has a TS of (160)*(26)=4160, etc. As illustrated, during the first period of speech, the compressor sees a value of TS_STRIDE=160, and during silence, TS_STRIDE is updated to 160*8=1280. Therefore, in a scenario where N=2 and the count for N is triggered at packet $SN_{12}$, the value of TS_STRIDE occurring in N occurrences of TS_STRIDE=1280. Thus, the RoHC compressor may estimate an updated value of TS_STRIDE during silence and hence, will have to send a larger packet.

In FIG. 12, TS_STRIDE is estimated as 160 during the first speech segment and the compressed header may be communicated to the decompressor by means of a UOR-0 or UOR-1 packet. However, during silence, when TS_STRIDE is updated to 1280, the apparent "jump" in TS_STRIDE requires the use of a larger UOR-2 ext 3, IR-DYN or IR packet to communicate the compressed value to the decompressor. As mentioned previously, these headers require at least 7 or 8 bytes and therefore, take up extra bandwidth. Once the RTP source transitions back to speech, TS_STRIDE appears to change back to 160*1=160 and the decompressor needs to be updated. Once again, the change is communicated to the decompressor via the larger UOR-2 ext 3, IR or IR-DYN header. This larger packet may need to be sent multiple times to communicate the change reliably, resulting in suboptimal use of bandwidth. Therefore, when RoHC is compressing packets generated by AMR, using a value of TS_STRIDE determined over N consecutive packets may still see a jump in TS_STRIDE between speech and silence segments in a talkspurt. This results in potential waste of bandwidth. AMR is discussed herein for illustrative purposes only. Concepts described may apply to other speech coding algorithms.

In one example, instead of updating TS_STRIDE if the same RTP TS increment is seen over N occurrences, a value "MIN_TS_STRIDE" may be used, where MIN_TS_STRIDE is the lowest calculated TS_STRIDE value during the flow. MIN_TS_STRIDE represents TS_STRIDE calculated when the source is not doing silence suppression, i.e., during talkspurts. For instance, for a VoIP flow employing silence suppression, MIN_TS_STRIDE corresponds to the change in RTP TS when the source is not performing silence suppression. This also corresponds to the actual TS_STRIDE to use for compression.

Figure 13:
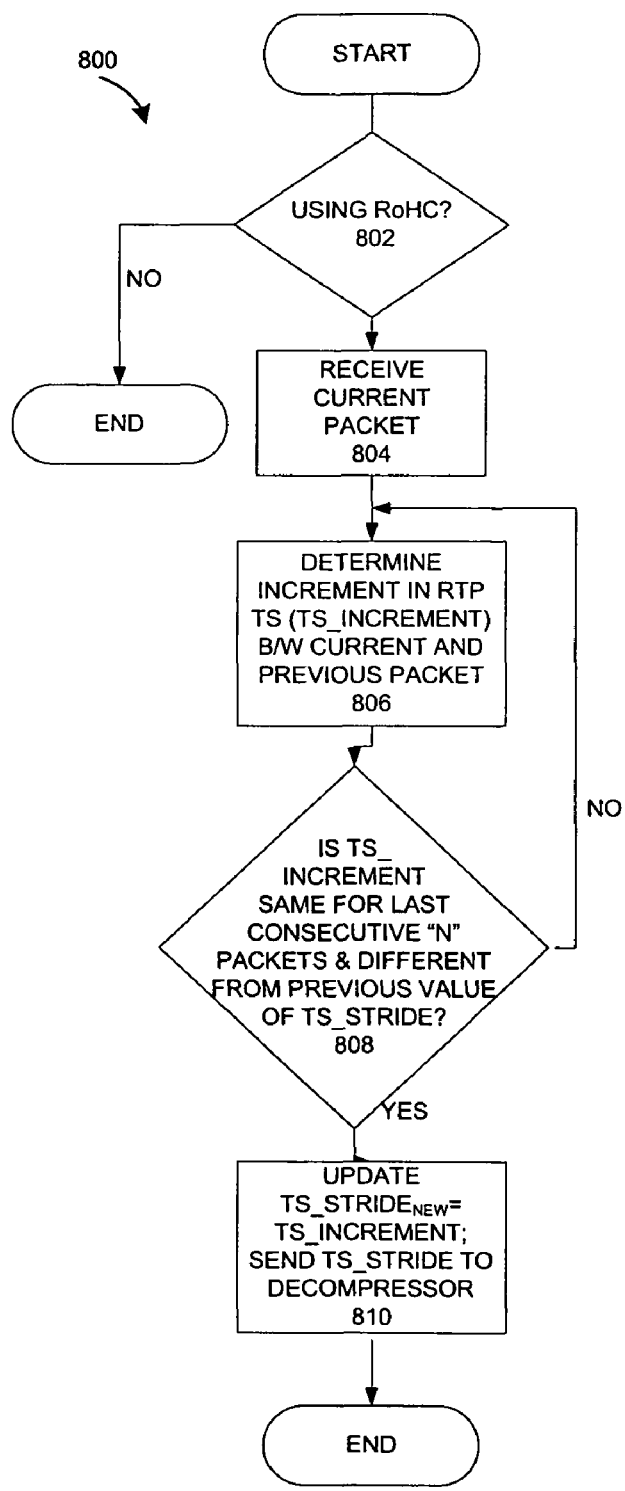
FIG. 13 illustrates a flowchart of an example of a process configured to improve performance of RoHC.

FIG. 13 is a flowchart of an example of a process configured to improve performance of RoHC. As illustrated, in step 802, it is determined whether RoHC is being implemented in a system. If not, the process ends. If RoHC is being implemented, a packet is received in step 804. In step 806, the increment in RTP TS between the received packet and a previously received packet is determined. This value is referred to as TS_INCREMENT. It may be assumed that an original value of TS_STRIDE has been used previously for compression. In step 808, if it is determined that TS_INCREMENT for the previous N consecutive packets is the same, and that this value differs from the current TS_STRIDE value, the process proceeds to the next step 810. If not, the process goes back to step 806. At step 810, TS_STRIDE is updated from the original value to TS_INCREMENT.

Figure 15:
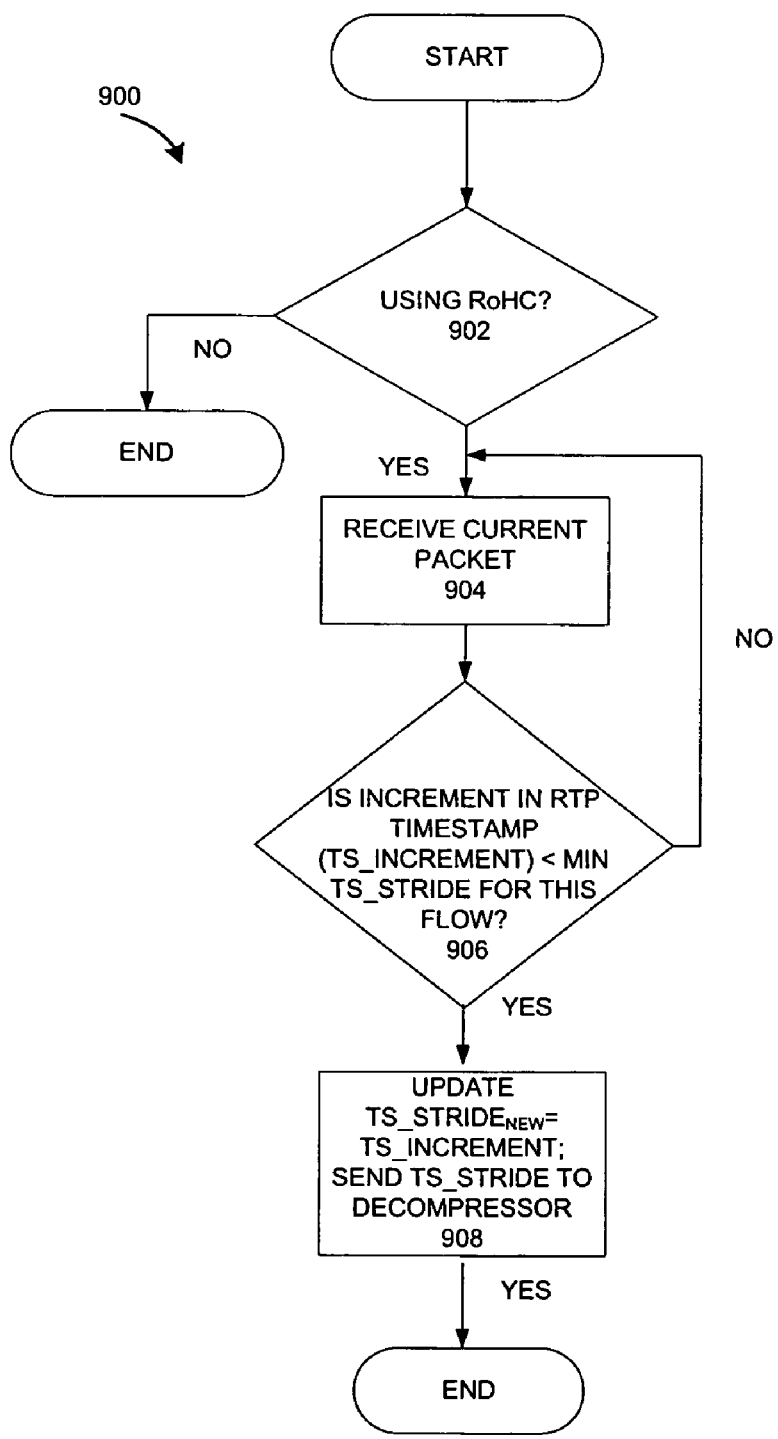
FIG. 15 illustrates a flowchart of another example of a process configured to improve performance of RoHC.

FIG. 15 illustrates a flowchart of another example of a process configured to improve the performance of RoHC. As illustrated, in step 902, it is determined whether RoHC is being implemented in a system. If not, the process ends. If RoHC is being implemented, a packet is received in step 904. At step 906, it is determined whether the increment in RTP TS is less than the minimum TS_STRIDE seen for the current packet stream. If not, the process returns to step 904; otherwise, the process proceeds to step 908. At step 908, TS_STRIDE is updated to the increment in RTP TS (which was less than the minimum TS_STRIDE for the flow.)

Figure 14:
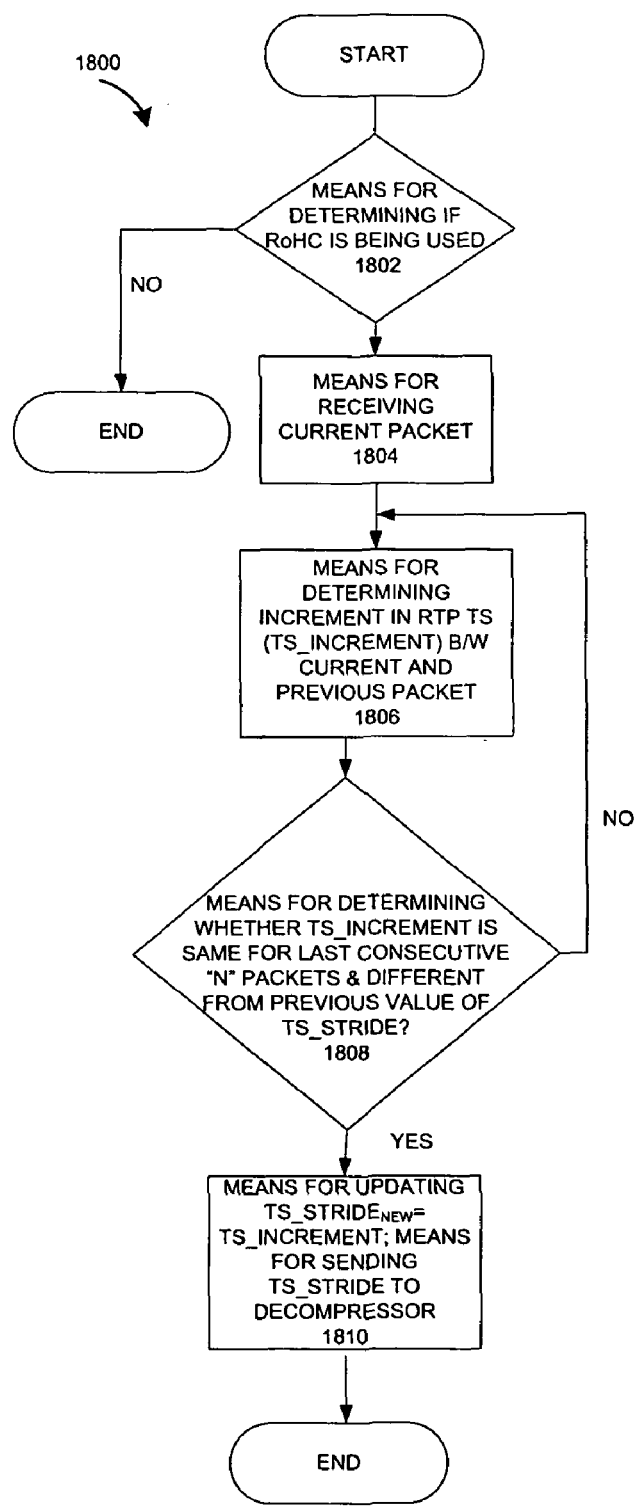
FIG. 14 illustrates means corresponding to the method of FIG. 13.
Figure 16:
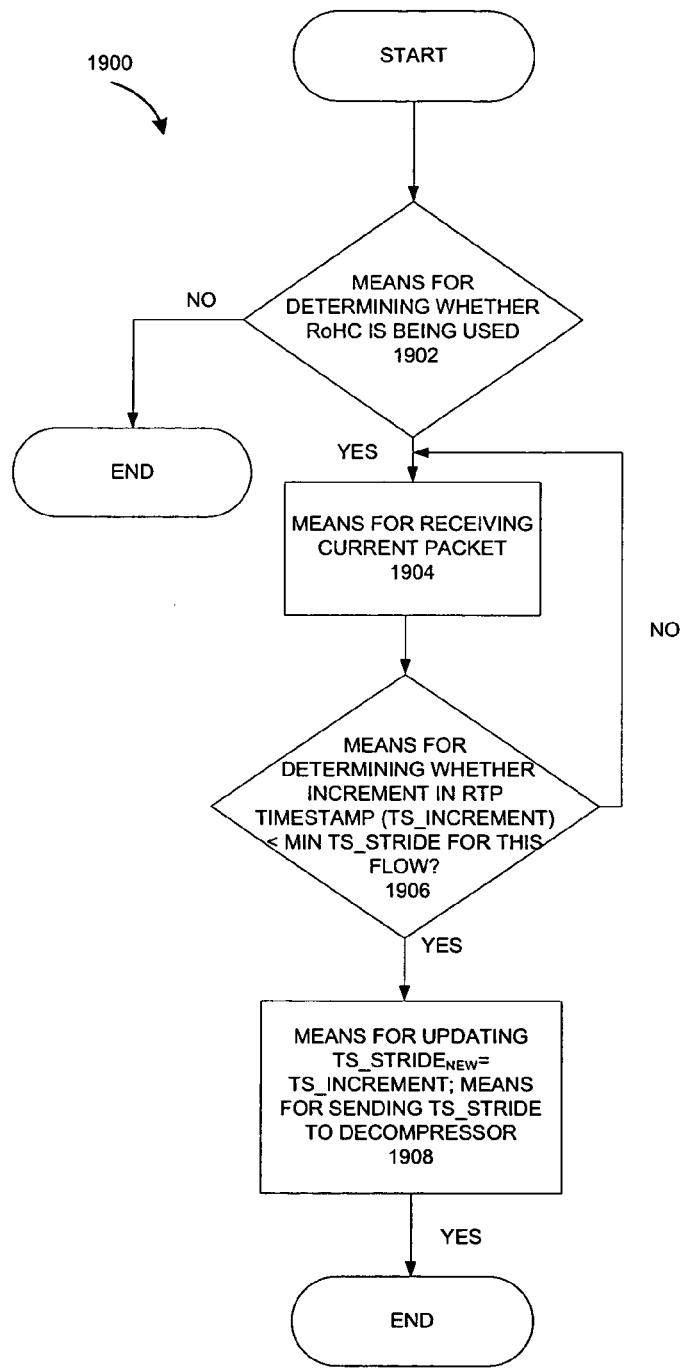
FIG. 16 illustrates means corresponding to the method of FIG. 15.

The methods of FIGS. 13 and 15 described above may be performed by corresponding means plus function blocks illustrated in FIGS. 14 and 16. In other words, blocks 802-810 illustrated in FIG. 13 correspond to means plus function blocks 1802-1810 illustrated in FIG. 14. Blocks 902-908 illustrated in FIG. 15 correspond to means plus function blocks 1902-1908 illustrated in FIG. 16.

In another aspect, when there is a change in TS_STRIDE between speech segments and silence, the change may not be properly communicated to the decompressor. "Context damage" occurs when the context of the decompressor is not consistent with the context of the compressor, and decompression fails to reproduce the original header. This situation may occur when packets have been lost or damaged between compressor and decompressor, or when the value of TS_STRIDE at the compressor fails to reach a decompressor. Packets that cannot be decompressed due to inconsistent contexts are "lost" due to context damage. Packets that are decompressed but contain errors due to inconsistent contexts are "damaged" due to context damage. ROHC may use a Cyclic Redundancy Check (CRC) over an original header to detect incorrect decompression. In a scenario where the compressor sees a first TS_STRIDE value while the decompressor sees a different value, there may occur a failure of such a CRC code.

For instance, in FIG. 12, suppose TS_STRIDE is 160 during the first speech segment, and 1280 during the silence segment as previously discussed. Assume further, that due to poor channel conditions, all UOR-2 ext 3 headers that were sent from the compressor to communicate the change in TS_STRIDE were dropped. As a result, even though the value of TS_STRIDE has changed from 160 to 1280 at the compressor, the decompressor does not see this change. Thus, when the decompressor regenerates a next packet, it uses a value representing TS_STRIDE=160 instead of the updated value of 1280. CRC fails because the regenerated packet is different from the originally transmitted packet. As a result, the decompressor may drop the regenerated packet.

Another advantage of algorithms described in this disclosure is that since TS_STRIDE is not estimated to change when RTP source goes from speech to silence and from silence to speech, any potential vulnerability introduced due to updating of TS_STRIDE when the RTP source transitions between silence and speech is eliminated.

Examples disclosed herein provide some examples of improving performance of RoHC when encountering silence suppression. Various disclosed examples may be implemented in any RoHC compressor, e.g., associated with an AT, an AN, and other devices employing header compression. Various units/modules and examples disclosed herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or processing unit). The memory unit may be implemented within the processor or external to the processor, in which case it can be communicatively coupled to the processor via various means known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for compressing a header comprising:
    determining a Real-Time Transport Protocol (RTP) timestamp (TS) for at least one of a plurality of successive packets;
    calculating a RTP timestamp increment for successive packets;
    finding a minimum RTP timestamp increment (MIN_TS_STRIDE) value over a duration of a flow;
    assigning the minimum RTP timestamp increment (MIN_TS_STRIDE) value as a timestamp stride (TS_STRIDE) value for compression;
    downscaling the value of each RTP timestamp (TS) by the timestamp stride (TS_STRIDE); and
    compressing the header using the assigned value.

2. The method of claim 1, wherein compressing comprises:
    determining an encoded value using window based least significant bit encoding; and
    updating a context with the encoded value.

3. The method of claim 2, wherein compressing further comprises:
    determining a difference between a first value in the context corresponding to a previous packet and a second value corresponding to a current packet;
    updating the context with the second value; and
    compressing a header of the current packet with the second value.

4. The method of claim 1, wherein the header comprises information related to at least one of Internet Protocol (IP), Real Time Transport Protocol (RTP), User Datagram Protocol (UDP), and Transmission Control Protocol (TCP).

5. The method of claim 1, wherein the timestamp increment (TS_STRIDE) is a number of samples in a packet.

6. An apparatus for compressing a header comprising:
    means for determining a Real-Time Transport Protocol (RTP) timestamp (TS) for at least one of a plurality of successive packets;
    means for calculating a RTP timestamp increment for successive packets;
    means for finding a minimum RTP timestamp increment (MIN_TS_STRIDE) value over a duration of a flow;
    means for assigning the minimum RTP timestamp increment (MIN_TS_STRIDE) value as a timestamp stride (TS_STRIDE) value for compression;
    means for downscaling the value of each RTP timestamp (TS) by a timestamp stride (TS_STRIDE); and
    means for compressing the header using the assigned value.

7. The apparatus of claim 6, wherein the means for compressing comprises:
    means for determining an encoded value using window based least significant bit encoding; and
    means for updating a context with the encoded value.

8. The apparatus of claim 7, wherein the means for compressing further comprises:
    means for determining a difference between a first value in the context corresponding to a previous packet and a second value corresponding to a current packet;
    means for updating the context with the second value; and
    means for compressing a header of the current packet with the second value.

9. The apparatus of claim 6, further comprising means for transmitting the compressed header.

10. An apparatus comprising:
    means for determining a minimum timestamp increment (MIN_TS_STRIDE) for a plurality of packets;
    means for receiving a current packet;
    means for determining a timestamp increment of the current packet;
    if the timestamp increment of the current packet is less than the minimum timestamp increment (MIN_TS_STRIDE) of the plurality of packets, means for updating a minimum timestamp increment (MIN_TS_STRIDE) value;
    means for transmitting the updated value to a decompressor;
    means for receiving a next packet; and
    means for compressing the next packet based on the updated minimum timestamp increment (MIN_TS_STRIDE).

11. The apparatus of claim 10, wherein the means for updating comprises:
    means for changing the minimum timestamp increment (MIN_TS_STRIDE) value to timestamp increment (TS_STRIDE) of the current packet.

12. A computer program product comprising:
    a non-transitory computer-readable storage medium comprising:
        a first plurality of code to determine a minimum timestamp increment (MIN_TS_STRIDE) for a plurality of packets;
        a second plurality of code to receive a current packet;
        a third plurality of code to determine a timestamp increment of the current packet;
        a fourth plurality of code to update a minimum timestamp increment (MIN_TS_STRIDE) value if the timestamp increment of the current packet is less than the minimum timestamp increment (MIN_TS_STRIDE) of the plurality of packets;
        a fifth plurality of code to transmit the updated value to a decompressor;
        a sixth plurality of code to receive a next packet; and
        a seventh plurality of code to compress the next packet based on the updated minimum timestamp increment (MIN_TS_STRIDE).

13. An apparatus for compressing a header comprising:
    a processor; and
    a memory operably connected to the processor, wherein said memory comprises instructions to:
        determine a Real-Time Transport Protocol (RTP) timestamp (TS) for at least one of a plurality of successive packets;
        calculate a RTP timestamp increment for successive packets;

find a minimum RTP timestamp increment (MIN_TS_STRIDE) value over a duration of a flow;

assign the minimum RTP timestamp increment (MIN_TS_STRIDE) value as a timestamp stride (TS_STRIDE) value for compression;

downscale the value of each RTP timestamp (TS) by the timestamp stride (TS_STRIDE); and compress the header using the assigned value.

14. The apparatus of claim 13, wherein said memory further comprises instructions to:

determine an encoded value using window based least significant bit encoding; and update a context with the encoded value.

15. The apparatus of claim 14, wherein said memory further comprises instructions to:

determine a difference between a first value in the context corresponding to a previous packet and a second value corresponding to a current packet;

update the context with the second value; and compress a header of the current packet with the second value.

16. The apparatus of claim 13, wherein the header comprises information related to at least one of Internet Protocol (IP), Real Time Transport Protocol (RTP), User Datagram Protocol (UDP), and Transmission Control Protocol (TCP).

17. The apparatus of claim 13, wherein the timestamp increment (TS_STRIDE) is a number of samples in a packet.

18. A computer program product comprising:

a non-transitory computer-readable storage medium comprising:

a first plurality of code to determine a Real-Time Transport Protocol (RTP) timestamp (TS) for at least one of a plurality of successive packets;

a second plurality of code to calculate a RTP timestamp increment for successive packets;

a third plurality of code to find a minimum RTP timestamp increment (MIN_TS_STRIDE) value over a duration of a flow;

a fourth plurality of code to assign the minimum RTP timestamp increment (MIN_TS_STRIDE) value as a timestamp stride (TS_STRIDE) value for compression;

a fifth plurality of code to downscale the value of each RTP timestamp (TS) by the timestamp stride (TS_STRIDE); and a sixth plurality of code to compress the header using the assigned value.

19. At least one processor for compressing a header comprising:

a first hardware module for determining a Real-Time Transport Protocol (RTP) timestamp (TS) for at least one of a plurality of successive packets;

a second module for calculating a RTP timestamp increment for successive packets;

a third module for finding a minimum RTP timestamp increment (MIN_TS_STRIDE) value over a duration of a flow;

a fourth module for assigning the minimum RTP timestamp increment (MIN_TS_STRIDE) value as a timestamp stride (TS_STRIDE) value for compression;

a fifth module for downscaling the value of each RTP timestamp (TS) by the timestamp stride (TS_STRIDE); and a sixth module for compressing the header using the assigned value.

20. A method comprising:

determining a minimum timestamp increment (MIN_TS_STRIDE) for a plurality of packets;

receiving a current packet;

determining a timestamp increment of the current packet;

updating a minimum timestamp increment (MIN_TS_STRIDE) value if the timestamp increment of the current packet is less than the minimum timestamp increment (MIN_TS_STRIDE) of the plurality of packets;

transmitting the updated value to a decompressor;

receiving a next packet; and compressing the next packet based on the updated minimum timestamp increment (MIN_TS_STRIDE).

21. The method of claim 20, wherein the updating comprises:

changing the minimum timestamp increment (MIN_TS_STRIDE) value to timestamp increment (TS_STRIDE) of the current packet.

22. An apparatus comprising:

a processor; and a memory operably connected to the processor, wherein said memory comprises instructions to:

determine a minimum timestamp increment (MIN_TS_STRIDE) for a plurality of packets;

receive a current packet;

determine a timestamp increment of the current packet;

update a minimum timestamp increment (MIN_TS_STRIDE) value if the timestamp increment of the current packet is less than the minimum timestamp increment (MIN_TS_STRIDE) of the plurality of packets;

transmit the updated value to a decompressor;

receive a next packet; and compress the next packet based on the updated minimum timestamp increment (MIN_TS_STRIDE).

23. The apparatus of claim 22, wherein said memory further comprises instructions to:

change the minimum timestamp increment (MIN_TS_STRIDE) value to timestamp increment (TS_STRIDE) of the current packet.

24. At least one processor comprising:

a first hardware module for determining a minimum timestamp increment (MIN_TS_STRIDE) for a plurality of packets;

a second module for receiving a current packet;

a third module for determining a timestamp increment of the current packet;

a fourth module for updating a minimum timestamp increment (MIN_TS_STRIDE) value if the timestamp increment of the current packet is less than the minimum timestamp increment (MIN_TS_STRIDE) of the plurality of packets;

a fifth module for transmitting the updated value to a decompressor;

a sixth module for receiving a next packet; and a seventh module for compressing the next packet based on the updated minimum timestamp increment (MIN_TS_STRIDE).

* * * * *